United States Patent [19]

Yokoyama et al.

[11] 4,151,111

[45] Apr. 24, 1979

[54] PROCESS FOR PREPARING TITANIUM TRICHLORIDE COMPOSITIONS

[75] Inventors: Masuzo Yokoyama; Akira Yamada; Siyouzo Okosi; Tokuo Katou; Shinichi Yoshida, all of Amimachi, Japan

[73] Assignee: Mitsubishi Petrochemical Company Limited, Japan

[21] Appl. No.: 787,969

[22] Filed: Apr. 15, 1977

[30] Foreign Application Priority Data

Jun. 18, 1976 [JP] Japan ................................. 51-71039

[51] Int. Cl.$^2$ ................................................ C08F 4/64
[52] U.S. Cl. ................................ 252/429 B; 526/137; 526/142
[58] Field of Search ................... 423/493; 252/429 A, 252/429 B, 429 C

[56] References Cited

U.S. PATENT DOCUMENTS

| | | | |
|---|---|---|---|
| 3,275,570 | 9/1966 | Emeleus et al. | 423/492 |
| 3,362,916 | 1/1968 | Price | 252/429 B |
| 3,482,935 | 12/1969 | Trementozzi et al. | 423/492 |
| 3,857,795 | 12/1974 | Van Der Bend | 252/429 A |
| 3,897,407 | 7/1975 | Shirai et al. | 252/429 B |
| 3,960,765 | 6/1976 | Shiga et al. | 252/429 B |
| 3,984,350 | 10/1976 | Karayannis et al. | 252/429 B |
| 4,086,185 | 4/1978 | Shirai et al. | 252/429 B |

*Primary Examiner*—Brian Hearn
*Attorney, Agent, or Firm*—Robert E. Burns; Emmanuel J. Lobato; Bruce L. Adams

[57] ABSTRACT

A process for preparing a titanium trichloride composition comprises the steps of:

(1) reducing titanium tetrachloride with oaganoaluminum compounds to produce a titanium trichloride composition having a $\beta$-crystal structure;

(2) heat treating the resulting titanium trichloride having a $\beta$-crystal structure and subsequently pulverizing the heat-treated titanium trichloride in the presence or absence of titanium tetrachloride to produce a titanium trichloride composition containing substantially no titanium trichloride having a $\beta$-crystal structure;

(3) treating the pulverized titanium trichloride composition with a complexing agent; and (4) treating the resulting titanium trichloride composition with a compound selected from the group consisting of metal halide compounds having Lewis acidity and interhalogen compounds.

19 Claims, No Drawings

PROCESS FOR PREPARING TITANIUM TRICHLORIDE COMPOSITIONS

BACKGROUND OF THE INVENTION

1. Field of the Invention

The present invention relates to a process for producing titanium trichloride compositions suitable for use as the transition metal component of Ziegler-type catalysts. More specifically, the present invention relates to a process for producing a Ziegler-type catalyst component for the polymerization of α-olefins having high stereospecificity and polymerization activiy by reducing and activating titanium tetrachloride according to a particular embodiment of the invention.

The present invention provides a process for producing highly stereospecific α-olefon polymers with a high yield.

2. Description of the Art

It is well known that Ziegler-type catalysts are used as catalysts for the stereospecific polymerization of α-olefins. It is also well known that titanium trichloride is first named as a transition metal compound which is one of the primary components of the Ziegler-type catalysts. The titanium trichloride is combined with an organoaluminum compound which is the other primary component to form a Ziegler-type catalyst.

The titanium trichloride is prepared by reducing the titanium tetrachloride. Ordinarily, titanium trichloride which contains the reduction reaction products of a reducing agent and other materials is used as a titanium trichloride composition for the catalyst component.

As one of the titanium trichloride catalyst components which have been widely used for industrial purposes, a titanium trichloride catalyst component is known which is prepared by reducing titanium tetrachloride with an organoaluminum compound or metallic aluminum. The titanium trichloride catalyst component so prepared is a titanium trichloride composition containing a certain amount of aluminum chloride (for example, about ⅓ mole of aluminum chloride per one mole of titanium trichloride).

In polymerizing olefins by using a Ziegler-type catalyst containing such a titanium trichloride composition, it is naturally required that the stereospecificity of the resulting olefin polymers be as high as possible and that such polymers be produced with as high a yield as possible. Various studies have been made to develop a catalyst capable of satisfying such requirements. Most of the studies appear to be directed to an improvement in the titanium trichloride composition.

For example British Pat. No. 1,391,068 discloses a process for producing a titanium trichloride composition which comprises reducing titanium tetrachloride with an organoaluminum compound, treating the resulting reduced solid (viz. titanium trichloride composition) with a complexing agent and further contracting the solid so treated with titanium tetrachloride. A Ziegler-type catalyst composed of the titanium trichloride composition so obtained has high activity and, at the same time, imparts good stereospecificity to the resulting olefin polymer. Accordingly, it can probably be stated that the titanium trichloride composition of the above mentioned British Patent is one of the best compositions which have been hitherto proposed.

The titanium trichloride prepared by reducing titanium tetrachloride with the oganoaluminum compound according to the known method is a β-modification or β-form in its crystal form. It is believed that the β-titanium trichloride is converted into a γ- or δ-titanium trichloride by further treating the β-modification with the complexing agent and titanium tetrachloride. In this case, it seems to be essential for obtaining high activity that the titanium trichloride produced by the reduction be of β-modification and this β-titanium trichloride be converted into other crystal structures.

That is, a process for treating a titanium trichloride composition obtained by reducing titanium tetrachloride with metallic aluminum instead of the organoaluminum compound in the same procedure described above has been proposed (as in British Pat. No. 1,370,559). In this process, the titanium trichloride produced by the reduction is a β-modification in its crystal form, and a Ziegler catalyst composed of a titanium trichloride composition resulting from the starting γ-titanium trichloride is far less active than a Ziegler catalyst composed of the titanium trichloride composition resulting from the titanium trichloride (β-modification) prepared by the reduction with organoaluminum compound.

On the other hand, U.S. Pat. No. 3,032,510 discloses a process for improving the polymerization activity of a Ziegler catalyst by dry-pulverzing a titanium trichloride composition which can be ordinarily used as a catalyst component for the stereospecific polymriization of α-olefins. However, as is fully described hereinafter, the pulverizing treatment does not always provide an improvement in activity.

SUMMARY OF THE INVENTION

It is an object of the present invention to provide a process for producing a titanium trichlorice composition which is capable of providing a Ziegler type catalyst having remarkably improved polymerization activity and producing α-olefin polymers possessing high stereospecificity. The present invention has achieved the above object by subjecting titanium trichloride prepared by reducing titanium tetrachloride with organoaluminum compounds to the activation treatments of heat treatment, pulverization, complexing agent treatment and halogen compound treatment.

Therefore, in accordance with the present invention, there is provided a process for producing a titanium trichloride which comprises the steps of:

(1) reducing titanium tetrachloride with organoaluminum compounds to produce titanium trichloride having a β-crystal structure;

(2) heat treating the resulting titanium trichloride having a β-crystal structure, and subsequently pulverizing the heat-treated titanium trichloride in the presence or absence of titanium tetrachloride to produce a titanium trichloride composition containing substantially no titanium trichloride having a β-crystal structure;

(3) treating the pulverized titanium trichloride composition with a complexing agent; and (4) treating the complexing agent treated titanium trichloride composition with a halogen compound selected from the group consisting of metal halides having Lewis acidity and interhalogen compounds (hereinafter referred to as a halogen compound).

Effects and Criticalities of the conditions for realizing the effects

A Ziegler type catalyst comprising the titanium trichloride composition prepared from a combination of the above described particular steps a higher activity than that comprising the titanium trichloride disclosed in the above mentioned British Pat. No. 1,391,068. By the utilization of the high polymerization activity and stereospecificity of the Ziegler-type catalyst of the present invention, it is possible to realize the production of α-olefin polymers containing a very small quantity of atactic polymer by-products without any need of the removal of the catalyst residues.

Such excellent catalytic performance, particularly high activity, can be obtained by a critical combination of the above mentioned steps. That is, first, pulverization provides no desired effect unless the titanium trichloride composition subjected to the pulverizing step is a titanium trichloride composition containing substantially no β-titanium trichloride and the titanium chloride composition has been prepared by heat treating a β-titanium trichloride so as to transform the β-modification into a γ-modification, and the β-titanium trichloride is a reduction product of titanium tetrachloride with organoluminum compounds. That is, for example, when the final treated solid obtained by the method described in British Pat. No. 1,391,068 is subjected to pulverization treatment, it is recognized that a Ziegler-type catalyst comprising the pulverized solid is remarkably inferior in polymerization activity, compared with a Ziegler-type catalyst comprising a solid which has not been subjected to pulverization treatment (reference is made to Comparative Example 9 set forth hereinafter).

Also, in the case where a reduced solid prepared by reducing titanium tetrachloride with an organoaluminum compound is subjected to pulverization treatment without heat treating the solid, even if the pulverized solid is subsequently subjected to the complexing agent treatment and titanium tetrachloride is subjected to a halogen compound treatment as described in British Patent No. 1,391,068, the resulting solid will have a far poorer catalytic performance than titanium trichloride obtained by the above cited patent application (reference is made to Comparative Example 10).

Further, in the process of the present invention, it is necessary that heat treatment be conducted prior to the pulverization process, and the two processes be conducted in a continuous sequence. That is, for example, a reduction-heat treatment-complexing-halogen compound treatment-pulverization or reduction-heat treatment-complexing-pulverization-halogen compound treatment process order is unable to provide a composition having such an excellent catalytic performance as is realized by the present invention (reference is made to Comparative Example 4 and 5).

Furthermore, a combination of heat treatment-pulverization treatment must be carried out subsequent to the reduction process. That is, for example, the reduction-complexing-heat treatment-pulverization-halogen compound treatment process order can not provide a catalyst with excellent catalytic performance (reference is made to Comparative Example 6).

In addition, although a process for producing a titanium trichloride composition of high polymerization activity by subjecting the titanium trichloride composition (β-modfication) prepared by reducing titanium tetrachloride with the organoaluminum compound to complexing agent and titanium tetrachloride treatments has already been taught in the above mentioned British Pat. No. 1,391,068, the complexing agent and the halogen compound treatments of the heat-treated solid (γ-titanium trichloride), without the pulverization thereof in the process of the present invention does not provide a catalyst having excellent catalytic performance (reference is made to comparative Example 8).

Additionally, it is necessary in the process of the present invention that pulverization be carried out under conditions such that substantially no β-crystal structure appears in the pulverized titanium trichloride composition (hereinafter fully described). It is generally, stated that a titanium trichloride composition obtained by reducing titanium tetrachloride with an organoaluminum compound having the formula $AlR_nCl_{3-n}$, wherein n is in the range of 1 to 3, at low temperatures has a β-crystal structure and the β-titanium trichloride when heated to a temperature above 100° C., is transformed into a γ-titanium trichloride. The heat-treatment process of the present invention utilizes this phenomenon.

However, even if a titanium trichloride composition, the crystal structure of which has been confirmed to undergo a definite transition from a β-modification to a γ-modification during the heat treatment, is pulverized, the γ-crystal structure of the composition will be generally transformed into a δ - or amorphous form. However, the phenomenon of the appearance of a β-crystal structure in the pulverized composition, depending upon the pulverization conditions has been confirmed (by the results of x-ray diffraction analysis). This phenomenon is believed to be unknown hitherto.

It is believed that the invention described in the above mentioned British Pat. No. 1,391,068 aims at achieving an improvement in performance by subjecting the β-titanium trichloride composition, obtained from the reduction of titanium tetrachloride with the organoaluminum compound, to the complexing agent and titanium tetrachloride treatments, because the β-titanium trichloride composition is unfavorable in terms of catalytic activity and the stereospecificity of the resulting polymer.

However, in this invention even if the pulverized composition in which the β-crystal structure has appeared, as stated above is subjected to the treatments (complexing agent and titanium tetrachloride treatments) of the known process, only a remarkably low catalytic activity is afforded (reference is made to Comparative Example 11). Concrete pulverization conditions, under which no substantial appearance of the β-crystal structure occurs, are determined in relation to reduction conditions and heat treatment conditions. It is also possible to suppress the appearance of the β-crystal structure by pulverizing the heat treated titanium trichloride composition in the presence of titanium tetrachloride. (Full illustrations will be given hereinafter).

DETAILED DESCRIPTION

1. Reduction of titanium tetrachloride

The reduction of titanium tetrachloride with an organoaluminum compound may be carried out by conventional known methods.

Organoaluminum compounds suitable for use as the reducing agent are those having the formula $AlR_nCl_{3-n}$, wherein n is greater than 0, but not greater than 3, preferably not greater than 2, i.e., $0<n\leq3$, or preferably $0<n\leq2$, and R represents a residue of hydrocarbon having from 1 to 10 carbon atoms. Examples of such organoaluminum compounds are: triethylaluminum (TEA), diethylaluminum chloride (DEAC), diisopropylaluminum chloride, diphenylaluminum chloride, ethylaluminum sesquichloride (EASC), and ethylaluminum dichloride (EADC). These compounds may be used alone or mixtures.

The molar ratio of organoaluminum compound to titanium tetrachloride may be suitably determined depending upon the type of the organoaluminum compound used. Specifically, for example, for DEAC an approximate equi-molar ratio of DEAC to titanium tetrachloride is preferable; for EASC any molar ratio provides approximately equal results provided that the atomic ratio of Al to Ti exceeds zero but is less than 3; and for EADC any molar ratio of EADC to titanium tetrachloride is possible, although the preferable molar ratio of EADC/TiCl$_4$ is in the range of from about 1:1 to 3:1. Even molar ratios other than these preferable ones can provide satisfactory results, if the treatment conditions of the subsequent processes are suitably adjusted.

The reduction temperature is ordinarily of the order of from $-30°$ C., to $30°$ C., and most preferably from $-5°$ C., to $+5°$ C.

The reduction time may be optionally selected as long as it is sufficient to ensure the attainment of the required reduction. Preferably, the organoaluminum compound is dropped into the titanium tetrachloride under stirring over a period of time above 2 hours.

The reduction reaction may be conducted in the presence or absence of a diluent such as inert hydrocarbons. However, for reasons of reaction temperature control and safety, the use of the diluent is preferable. In addition, aliphatic hydrocarbons containing a few percent of armoatic hydrocarbons such as benzene and toluene, for example, industrial heptane may also be used as a diluent.

When the dropping of the reducing agent has been completed, it is preferable to continue the stirring of the reaction system, preferably, at a temperature higher than the reduction temperature, for example, $0°$ to $80°$ C., in order to complete the reduction reaction.

After the completion of the reaction, the resultant dark brown reduced solid is fully washed with inert hydrocarbons, such as hexane and heptane which has been adequately dewatered and degassed, whereupon the reduced solid is ready for the subsequent heat treatment.

2. Heat treatment

The heat treatment which is conducted prior to pulverization is essential for the present invention. It is necessary to transform, by this heat treatment, the titanium trichloride having a $\beta$-crystal structure into one having a $\gamma$ - crystal structure to produce a titanium trichloride composition containing substantially no $\beta$-crystal structure. Unless this heat treatment is carried out, the subsequent pulverization process will become almost ineffective.

This heat treatment may be carried out by the following two systems:

(i) A system wherein the reduced solid in a powdery state is heated in an atmosphere of an inert gas such as argon or nitrogen at a temperature of from $100°$ C. to $200°$ C., preferably about $150°$ to $180°$ C., for about 1 to 10 hours.

(ii) A system wherein the reduced solid in a slurry state in an inactive hydrocarbon solvent is heated at a temperature of from $100°$ C. to $200°$, preferably about 150 to $180°$ C., for about 1 to 10 hours.

When the solid undergoes change upon being heat treated, changes in the color and crystal structure of the solid can be most distinctly distinguished. That is, the color of the solid changes from dark brown to purplish red or black purple. This is considered to correspond to the transition of the crystal structure of the solid from the $\beta$- modification to the $\gamma$-modification. The $\beta$- titanium trichloride can be clearly determined by x-ray diffraction spectra because it has diffraction spectra distinctly different from those of the other crystal structure at a diffraction angle $2\theta$ of $16.3°$ and $50.3°$. After the heat treatment, these diffraction spectra of the $\beta$- modification disappear and diffraction spectra characteristic of the $\gamma$ - modification appear at a diffraction angle $2\theta$ of $15.0°$ and $51.3°$. Thus, the transition of the crystal structure can be confirmed from these diffraction spectra.

However, in the heat treatment of the present invention, not all of the heat treatment conditions under which such transition of the crystal structure can be confirmed by x-ray diffraction are practicable. The reason for this is that even the heat treated solid, wherein a complete transition of the $\beta$- crystal structure to the $\gamma$- crystal structure occurs and diffraction pattern characteristic of the $\beta$- modification is not detectable by means of x-ray diffraction analysis, may exhibit a strong diffraction spectrum characteristic of the $\beta$- modification or form a mixed crystal having the $\beta$- and $\delta$ - crystal structure when it is subjected to pulverization treatment. Such a solid catalyst component exhibiting partially or wholly the $\beta$- crystal structure on pulverization cannot form a catalyst component having excellent performane even if it is subsequently subjected to complexing agent and halogen compound treatments.

The appearance of the $\beta$- modification during the pulverization of the $\gamma$ - modification solid is related to not only the heat treatment conditions but also the nature or composition of the reduced solid. In other words, not all of the heat treatment conditions under which the transition of the $\beta$- modification to the $\gamma$ - modification occurs are effective in the heat treatment of the present invention. In order to avoid the appearance of the $\beta$- modification during pulverization, an appropriate combination of the preparation conditions of the reduced solid, the heat treatment conditions, and pulverization conditions should be determined.

More particularly, in the case where the reduced solid contains a relatively large amount of aluminum compounds (for example, when the EADC is used as a reducing agent), mere heat treating of the reduced solid at a relatively low temperature for a short period of time ($155°$ C., about 2 hours) leads to satisfactory effects of pulverization treatment without the occurrence of the $\beta$- modification after the pulverization. On the other hand, when the reduced solid contains a small amount of aluminum compounds (for example when the DEAC is used as a reducing agent), heat treatment must be conducted at high temperatures and/or for a long period of time; otherwise the $\beta$- modification appears during the pulverization, damaging the pulverization effect. In addition, heat treatment at a temperature above $200°$ C. is unfavorable because the reduced solid is chemically affected.

Now, referring to the connection with the pulverization conditions, when a strong pulverization treatment is effected, the heat treatment should be conducted under as severe conditions as possible as long as the reduced solid is not chemically affected. Conversely, in the case where a mild pulverization is effected, a relatively mild heat treatment may be used.

As stated above, in the process for producing the titanium trichloride composition according to the present invention, the practice of heat treatment under conditions such that the transition of the β- modification to the γ- modification occurs is a necessary condition but not a satisfactory condition.

In accordance with the process of the present invention, the heat treatment conditions should be determined in relation to a combination of the reduction method of the prior step and the pulverization conditions of the subsequent step in order to attain the desired object. In general, the heat treatment conditions should be selected from within the temperature range of 155° to 200° C. and the period range of 1 to 10 hours.

3. Pulverization

It is considered that among the various properties of the titanium trichloride catalyst component, that properties which are considered to have an influence on the polymerization activity of the final catalyst are the surface area, the crystal state, the state of formation of a lattice defect and the state of aggregation of the crystallite. It will be easily conjectured that these properties are largely influenced when the titanium trichloride catalyst component is pulverized.

X-ray diffraction analysis indicates that, while the reduced solid when heat treated exhibits a very sharp diffraction spectrum, indicating that the γ - crystal structure thereof is relatively complete, it gives only a broad diffraction spectrum after the pulverization thereof. This indicates that when the heat treated solid is pulverized, the γ - crystal structure of the solid is almost completely destroyed into a δ - or amorphous crystal structure. Observation of microphotographs of the pulverized solid also indicates that the solid particles have been irregularly destroyed.

However, notwithstanding that the properties of the solid have been largely changed by pulverization as stated above, the solid subjected to only the treatments up to the pulverization step in the series of treatments exhibits only a very low performance when it is used as a titanium trichloride catalyst component.

On the other hand, even if the titanium trichlorid composition after the heat treatment is subject to complexing agent and halogen compound treatments without pulverizing the composition, the composition also exhibits only a low performance when used as a catalyst component. It is considered that the heat treatment and the subsequent pulverization treatment cause the effects of the subsequent complexing agent and halogen compound treatments to be exhibited to a larger extent as compared with mere complexing agent and halogen compound treatments of the reduced solid.

In the pulverization process, it is particularly to be noted that while the prior process of heat treatment changes the crystal structure of the titanium trichloride from the β-modification to the γ-modification to give the crystal structure substantially free of the β-modification the β- crystal structure may again appear depending on pulverization conditions. This is related to a newly observed phenomenon wherein, when a heat treated solid in which the diffraction spectra characteristic of the β-crystal structure has disappeared and a complete transition of the β-modification to the γ-modification is verified to have occured by x-ray diffraction analysis is pulverized, the β-modification may again be detected by x-ray diffraction analysis is pulverized, the β-modification may again be detected by x-ray diffraction analysis depending on the pulverization conditions.

In this manner, the titanium trichloride composition containing the β- crystal structure produced by the pulverization does not form a catalyst component having high activity even if it is subjected to the subsequent complexing agent and halogen compound treatments. When titanium tetrachloride is selected, for example, from among various halogen compounds, it is possible to eventually convert this the crystal structure of the titanium trichloride composition into the γ- or δ- crystal structure, which is a desirable crystal structure as a stereospecific polymerization catalyst, by selecting an appropriate condition for the titanium tetrachloride treatment. However, such a method can not produce a solid catalyst component having high activity, as is prepared according to the process of the present invention.

In the case where metal halides other than the titanium tetrachloride are used, the treatment of the titanium trichloride composition containing the β-crystal structure eventually does not always produce a solid component having the δ- or amorphous crystal structure, which is preferable as a catalyst component. It is important for the production of a highly active catalyst according to the process of the present invention, that the titanium trichloride composition possess the δ- or amorphous crystal structure after the pulverization and retain the same crystal structure after complexing agent and halogen compound treatments.

Even if the reduced solid (β-modification) is directly pulverized and subjected to complexing agent and halogen compound treatments without carrying out the heat treatment, a titanium trichloride catalyst component having excellent performance cannot be obtained, although this is estimated from the above mentioned results to some extent. By x-ray diffraction analysis, we have observed that a β- titanium trichloride composition seems to undergo little destruction of its crystal structure even on pulverization.

The process according to the afore-mentioned British Pat. No. 1,391,068 attains the desired effects by using the β- titanium trichloride composition, whereas in the process for producing the titanium trichloride catalyst component of the present invention, which comprises the pulverization treatment step, the titanium trichloride composition containing the β- crystal structure cannot form a solid catalyst component exhibiting high performance, even if the composition is treated in the same manner as in this known process. This is an interesting difference, although the reason therefor is not clear.

Accordingly, the pulverization condition necessary for the pulverization process of the present invention is that pulverization be carried out under conditions such that substantially no β- crystal structure occurs in the crystal structure of the titanium trichloride.

As an example of pulverization, any pulverization system wherein pulverization is carried out in a ball mill, vibrating mill, or impact mill in an atmosphere of an inert gas at room temperature or under cooling is feasible. However, in the practice of the pulverization treatment of the present invention, particular consideration should be given to the strength or extent of pulverization, such as pulverizing time and the number of vibrations, amplitude, ball/pot ratio, solid titanium trichloride component/ball ratio in the case of a vibrating mill and the like. However, as stated in the description of the heat treatment, the composition of the reduced solid and the heat treatment conditions must be taken into consideration in order to effect an effective pulverization. Accordingly, the optimum pulverization condition should be suitably determined in conjunction with these three production steps.

For example, when a solid obtained by reducing titanium tetrachloride with DEAC, the molar ratio of $TiCl_4$ to DEAC being 1, is pulverize d in a vibrating mill, ball/pot volume ratio being 0.8, $TiCl_3$/ball ratio being 20g/800 (apparent volume), vibration frequency being 1410VPM, amplitude being 3.5 mm, the solid heat-treated at a temperature of 155° to 160° C. for 2 hours (after the heat treatment, the solid assumed a purplish red color and was determined to be of completely $\gamma$-modification by x-ray analysis) assumes the $\beta$-crystal structure after a 24 hours' pulverization, and, thus, the solid so treated has poor reproducibility. Accordingly, such heat treatment-pulverization condition is not very favorable for the production of a solid catalyst component.

In contrast, the solid, heat treated at a temperature of 70° C. for 4 hours always provides a titanium trichloride composition having a 67 - crystal structure with good reproducibility if it is pulverized within 24 hours under the same pulverization conditions. In this case, a 48 hours of pulverization produces for the first time a mixed crystel of $\delta$ - and $\beta$- crystal structures, and this condition begins to be within the unstable range of pulverizarion conditions.

All pulverizations for a period of time of not less than 72 hours result in a $\beta$- crystal structure. Further, the solid which has been heat-treated at a temperature of 160° C. for 8 hours exhibits no $\beta$- crystal structure even after 48 hours of pulverization, and the crystal structure of the solid is destroyed and rendered into an amorphous state, but the titanium trichloride is determined to be a 67 - midification. On the other hand, whe n the EASC or EADC is used as a reducing agent, the solid which has been heat-treated at a temperature of 155° C. for 2 hours does not result in the occurrence of a $\beta$-crystal structure even after the 24 hours of pulverization and provides the effects of the present invention.

As is apparent fromthe foregoing, pulverization conditions suitable for providing the effects of the present invetion may be determined by combining the conditions of the reduction-heat treatment-pulverization in various forms. However, it is very complicated and difficulat to quantitatively represent a practicable range of pulverization conditions in relation to the various factors. Generally, when pulverization is conducted as thoroughly as possible within the range wherein no $\beta$-crystal structure appears, the effects of the present invention can be more fully expected. However, it is of course necessary to consider the fact that the catalystic performance is influenced by not only pulverization conditions, but also the method for preparing the reduced solid and the heat-treatment conditons (even if pulverization is carried out under the same pulverization conditions within which no $\beta$- structure appears).

In conclusion, suitable conditions are that heat treatment be carried out at a temperature of 150° to 180° C. within 10 hours and pulverization be carried out within the range of about 10 to 72 hours depending upon the nature of the reduced solid.

In addition, the pulverization-treated solid should contain absolutely no $\beta$- crystal structure.

As previously mentioned, various complex factors are involved in the determination of pulverization conditions. Thus, needless to say, it is desirable that the pulverization conditions be determinable irrespective of various factors other than the pulverization factors.

We have found that when the heat treated solid is ground together with titanium tetrachloride, even under conditions such athat a $\beta$- crystal structure appears, it is possible to prevent the formation ofthe $\beta$-crystal structure. Thus, the co-pulverization of the heat-treated solid in the presence of titanium tetrachloride in order to pre vent the $\beta$- crystal structure from occurring during the pulverization is also one of the embodiments wherein "pulverization is conducted under the condition such that no $\beta$- crystal structure appears".

The quantity of the titanium tetrachloride to be added during the pulverization treatment is in the range of 0.03 to 0.3 mole, preferably 0.05 to 0.2 mole, per mole of titanium trichloride. The use of an excessively large quantity of the titanium tetrachloride causes the sticking of the mass to the pot during the pulverization and, therefore, is unfavorable.

The reason why the formation of the $\beta$- crystal structure can be prevented by the co-pulverization with the titanium tetrachloride is not fully clear. However, the appearance of such a titanium tetrachloride effect is a phenomenon characteristic of a solid prepared by reducing titanium tetrachloride with an organoaluminum compound because the formation of the $\beta$- crystal structure does not occur during pulverizing in the case of a solid prepared by reducing titanium tetrachloride with metallic aluminum.

The co-pulverization with titanium tetrachloride is superior to the pulverization of the heat treated titanium trichloride composition by itself in that the former enlarges the range of the reduced solids which can be supplied to the catalyst preparation and the practicable ranges of heat treatment and pulverization conditions, whereby the range of combinations of the treatment conditions to be determined between the reduction — heat treatment — pulverization interrelation is further widened and the freedom of choice for treatment conditions is increased.

For example, a solid prepared by reducing titanium tetrachloride with DEAC and by heat-treating the reduced solid at a temperature of 155° to 160° C. for 2 hours exhibits the $\beta$- crystal structure when it is ground by itself for 24 hours, whereas it exhibits no formation of the $\beta$- crystal structure even after a 48 hours' pulverization when it is ground together with titanium tetrachloride at a molar ratio of $TiCl_4$ to $TiCl_3$ of 0.1. When the pulverization of the reduced solid by itself requires approximately 48 hours of pulverization, the heat treatment should be conducted with sufficient throughness to ensure the transition of the crystal structure. On the contrary, in the above mentioned co-pulverization, the 48 hours of pulverization can be carried out even with a relatively mild heat treatment. Of course, the co-pulverization with titanium tetrachloride may be carried out under the respective treatment conditions which are applicable to the pulverization of the reduced solid by itself. However, the titanium tetrachloride co-pulverization process can produce a titanium trichloride catalyst component having high performance even under conditions such that this catalyst component cannot be prepared by the single-material pulverization process.

These expanded individual treatment conditions related to the titanium tetrachloride co-pulverization process should also be determined in relation to the composition of the reduced solid-heat treatment condition - co-pulverization condition. That is, in all the cases where the co-pulverization with titanium tetrachloride is carried out, the formation of the $\beta$- crystal structure is not always avoided, but the range of various conditions under which no β- crystal structure develops is only widened.

In addition, co-pulverization with titanium tetrachloride provides no substantial improvement in the catalytic performance of the pulverized material itself in polymerization activity and ability for imparting stereospecificity, and the resulting catalytic performance is substantially similar to that obtained by the single-material pulverization itself and becomes remarkably inferior unless the complexing agent and halogen compound treatments are subsequently conducted. Even in the case where the subsequent complexing agent and halogen compound treatments are carried out, the co-pulverization may sometimes provide a solid catalyst component of higher performance than that obtained by the single-material pulverization, but there is no great difference between the two.

Accordingly, it should be understood that the outstanding effect of the titanium tetrachloride co-pulverization method is that the method makes possible the production of a titanium trichloride catalyst component with high reproducibility and stability under a wide range of reduction-heat treatment-pulverization conditions.

The titanium trichloride contained in the pulverized mass thus obtained is of δ - modification or amorphous in crystal structure due to the transition from the γ - modification. However, it may contain a small amount of the γ - crystal structure provided that it contains substantially no β- titanium trichloride.

4. Complexing agent treatment

The complexing agent which may be used in the complexing treatment of the present invention includes various electron donative compounds containing at least one atom selected from the group consisting of oxygen, nitrogen, phosphorus, and sulfur. Illustrative of such compounds are alcohols, esters, ethers, ketones, and amines. Particularly, the ethers provide good results.

Examples of the ethers include diethyl ether, di-n-butyl ether, di-n-amyl ether, diisoamyl ether, di-n-hexyl ether, anisole, diphenyl ether, diethylene glycol dimethyl ether, and diethylene glycol mono-n-butyl ether.

The quantity of the complexing agent to be used is in the range of 0.3 to 3.0 moles, preferably 0.3 to 2.0 moles, per one mole of titanium trichloride. The titanium tetrachloride co-pulverization method has the optimum quantity ratio of the complexing agent at a higher "complexing agent/TiCl$_3$ ratio" than the single-material pulverization method.

The complexing treatment can be suitably carried out at room temperature to 100° C. for 30 minutes to 4 hours. It is also desirable that the complexing treatment be conducted in the presence of an inactive hydrocarbon solvent. Following a thorough washing step, the complexing agent-treated titanium trichloride is then subjected to the halogen compound treatment.

In addition, the titanium trichloride composition which has been subjected to only the processing up to the complexing treatment exhibits only a very low catalytic performance.

5. Halogen compound treatment

The titanium trichloride composition subjected to the complexing treatment as stated above is then treated with a metal halide having a Lewis acidity or an interhalogen compound.

(1) Metal halide compound treatment

Examples of the metal halide compound include $ZnX_2$, $HgX_2$, $BX_3$, $AlX_3$, $GaX_3$, $SiX_4$, $GeX_4$, $SnX_4$, $SnX_2$, $PX_5$, $PX_3$, $SbX_5$, $SbX_3$, $SeX_4$, $TeX_4$, $TiX_4$, $TiX_3$, $ZrX_4$, $VX_4$, $VX_3$, $MoX_5$, $WX_5$, $CoX_2$ and $NiX_2$, wherein X represents F, Cl, or Br. As a halogen, chlorine is preferred. $TiCl_4$, $TeCl_4$, $SeCl_4$ and $SbCl_3$ are preferred. These metal halide compounds may be used singly or in mixtures with one or more of the other above-mentioned compounds.

When titanium tetrachloride, for example, is used as a metal halogen compound, the treatment may be carried out in the presence or absence of a diluent at room temperature to 100° C. for about 30 minutes to 5 hours. The diluents usable for this treatment include aliphatic, alicyclic or aromatic hydrocarbon compounds having 1 to 12 carbon atoms, and halogenated hydrocarbon compounds having 1 to 12 carbon atoms. The use of the halogenated hydrocarbon diluents produces good results. It is preferable that, when the concentration of the titanium tetrachloride is high, a relatively low treatment temperature be used, and, on the other hand, when the concentration of the titanium tetrachloride is low, a high treatment temperature be used. In general, 0.005 to 10 moles, preferably 0.05 to 1 mole of the metal halide per mole of titanium trichloride is used.

X-ray diffraction analysis of the resulting solid catalyst component after treating and washing indicates that the titanium tetrachloride treatment results in crystal growth of the solid. This is particularly conspicuous at a higher concentration of the titanium tetrachloride or higher temperature of the treatment. This crystal growth adversely affects the catalytic performance of the titanium trichloride composition. Accordingly, the preferred conditions for the titanium tetrachloride treatment are those under which no crystal growth occurs. These treatment conditions may be determined on the basis of the degree of crystal growth in relation to the concentration of titanium tetrachloride—the treatment temperature — the treatment time.

Under these circumstances, in the case of the treatment with titanium tetrachloride, the treatment conditions are relatively limited because of the occurrence of the unfavorable phenomenon of crystal growth. However, if the other metal halide compounds are used, a broader range of treatment conditions may be used. In this case, if a treatment at an excessively high temperature for a long period of time is carried out, crystal growth also occurs, and, thus, such treatment conditions are not favorable. The treatment conditions under which the desired effects thereof are obtained will be readily determined by those skilled in the art. In all cases, the treatment conditions under which no crystal growth occurs should be adopted.

If a solid metal halide such as aluminum chloride is used, it is generally used in a suspended state in an inactive solvent. Moreover, such a solid metal halide may be used by partially dissolving it in a solvent such as aromatic hydrocarbons in which it has a relatively high solubility. Further, a complexed solution of a metal halide compound in an electron donative compound may be brought into contact with a titanium trichloride solid component. In addition, when the metal halide compounds are a solid, these metal halide compounds may be used in a finely divided form in order to ensure good contact with the solid titanium trichloride component to be treated and high reactivity with the complexing agent, such as ether, remaining in the solid component.

(2) Interhalogen compound treatment

The titanium trichloride composition subjected to the complexing agent treatment described above is treated with an interhalogen compound having the formula $XY_n$ wherein X and Y respectively represent a different halogen atom, and n is an integer of 1, 3, 5 or 7, instead of the metal halide compound treatment.

Examples of such interhalogen compound are $ClF$, $BrF$, $IF$, $BrCl$, $ICl$, $IBr$, $ClF_3$, $BrF_3$, $BrF_3$, $IF_3$, $ICl_3$ ($I_2Cl_6$), $ClF_5$, $BrF_5$, $IF_5$ and $IF_7$. $ICl_3$ and $ICl$ are preferable.

The interhalogen compound displays sufficient effectiveness even when it is used in a small quantity. The interhalogen compound is used in a molar ratio to the titanium trichloride of about 0.005:1 to 0.2:1, preferably about 0.005:1 to 0.1:1.

The treatment with the interhalogen compound is ordinarily carried out in the presence of a diluent at room temperature to 150° C. for 30 minutes to 10 hours. The diluents suitable for use in this treatment are aliphatic, alicyclic or aromatic hydrocarbon compounds having 1 to 12 carbon atoms or halogenated hydrocarbon compounds having 1 to 12 carbon atoms. The use of the halogenated hydrocarbon diluents produces good results.

The interhalogen compound treatment results in remarkable advantages simultaneously with respect to both the catalytic activity and stereospecificity of the resulting catalyst component.

6. Polymerization of olefin

The titanium trichloride composition prepared in the manner described above is combined with an organoaluminum compound having the formula $AlR_nX_{3-n}$ wherein n is a value in the range of 1 to 3, X represents a halogen and R represents a hydrocarbon radical having from 1 to 10 carbon atoms to produce a catalyst for stereospecific polymerization of α-olefins. The organoaluminum compound is used with a weight ratio to the titanium trichloride composition of 0.5:1 to 100:1, preferably 1:1 to 30:1.

Polymerization of olefins may be carried out by a slurry polymerization method using an inert hydrocarbon such as hexane, heptane and cyclohexane as a solvent; a liquid phase polymerization method using a liquefied monomer as a solvent; or a gas phase polymerization method wherein a monomer is present as a gaseous phase. The polymerization may be carried out by a continuous process or batch process. The polymerization temperature is ordinarily in the range of 30° to 120° C., preferably 50 to 100° C. The polymerization pressure is ordinarily in the range of atmospheric pressure to 100 atmospheres, preferably atmospheric pressure to 50 atmospheres.

The α-olefins which may be polymerized singly or copolymerized in the presence of the catalyst of the present invention include ethylene, propylene, 1-butene and 4-methylpentene-1. The molecular weight of the resulting polymer is adjusted by any of known processes using hydrogen or diethylzinc.

7. Experimental Example

Example 1

(1) Preparation of titanium trichloride catalyst component (i) Reduction of titanium tetrachloride 90 ml of hexane and 22.5 ml of titanium tetrachloride were placed in a 500-ml four-necked flask equipped with a stirrer. Then a solution of 75 ml of hexane and 25.3 ml of DEAC was continuously dropped into the flask under an atmosphere of argon for over 4 hours through a widmer apparatus. The reaction solution was kept at a temperature of 1° C. After the completion of the dropping, stirring was continued at that temperature for 15 minutes, after which the temperature was raised to 65° C., and the solution was stirred at that temperature for an additional 1 hour to complete the reaction.

The reaction mixture was left standing, whereupon a black brown solid was obtained. This solid was washed five times each time with a 100-ml portion of hexane by decantation.

(ii) Heat treatment

A flask containing a slurry of the black brown solid obtained in (i) was immersed in an oil bath to remove the solvent by evaporation to dryness. Then the solid in a ground state was heated in an atmosphere of argon at a temperature of 155° C. for 2 hours. During this heat treatment, the color tone of the solid changed from black brown to purplish red or dark purple.

After the heat treatment, a portion of the solid was removed and subjected to an X-ray diffraction measurement. The solid displayed a sharp diffraction spectrum at a $2\theta$ of 15.0° and a spectrum characteristic of a γ - crystal structure of titanium trichloride at a $2\theta$ of 51.3°. As a result, the solid was confirmed to be a γ - titanium trichloride composition of high crystallinity containing no β- crystal structure.

(iii) Titanium tetrachloride co-pulverization treatment 15g of the heat treated solid obtained in (ii) and 0.83 ml of titanium tetrachloride were charged into a pot of a vibrating mill in a dry box under an atmosphere of argon gas. The heat treated solid contained an aluminum component in a molar ratio to the titanium component of 0.24. On the assumption that the aluminum component was $AlCl_3$, the added $TiCl_4$ had a molar ratio of 0.092 with respect to the $TiCl_3$ contained in the solid.

The pulverization in the vibrating mill was carried out under the following conditions:

| | |
|---|---|
| Volume of pot | 1 liter |
| Apparent volume of ball | 0.8 liter |
| Diameter of ball | 12.7 mm |
| Vibration frequency | 1,410 VPM |
| Vibration amplitude | 3.5 mm |
| Pulverizing time (at room temperature) | 48 hours |

(iv) Complexing treatment

After confirmation by x-ray diffraction analysis of the fact that the pulverized material obtained in (iii) contained no β- titanium trichloride, 10g of the solid sample was subjected to complexing treatment. The complexing treatment was carried out by complexing a suspension of 10g of the sample in 50 ml of hexane with 16.2 ml of diisoamyl ether (a molar ratio of isoamyl ether to $TiCl_3$ of 1.49) at a temperature of 35° C. for 2 hours.

After the completion of the reaction, the reaction mixture was left standing and then washed five times each time with a 50-ml portion of hexane by decantation.

(v) Halogen compound treatment

After almost all of the supernatant liquid of the solid slurry obtained in (iv) was removed, 30 ml of hexane and 20 ml of titanium tetrachloride (TiCl$_4$ = 40% by volume) were added to the remaining solid slurry, and the resulting mixture was stirred at a temperature of 65° C. for 2 hours to provide an intimate contact between the TiCl$_4$ solution and the solid component.

When the treatment had been completed, the solid component was again washed five times each time with a 50-ml portion of hexane by decantation. Finally, the resultant solid component was subjected to vacuum evaporation to remove the solvent therefrom, whereby a powdery titanium trichloride composition, i.e., a titanium trichloride component was obtained.

(2) Polymerization of propylene (gas-phase polymerization)

20g of polypropylene powders as a catalyst dispersing agent was introduced into an autoclave having a capacity of 1 liter and equipped with a stirrer. The autoclave was subjected to evacuation while it was heated, so that the dispersing agent was degassed to a sufficient degee and dried. Following this, catalyst components were introduced into the autoclave under an atmosphere of a propylene gas in the following order:

(i) DEAC (diethylaluminum chloride)—150 mg
(ii) the titanium trichloride catalyst component obtained in (v)—30 mg
wherein the weight ratio of DEAC to titanium trichloride composition was 5.

1000 ml of hydrogen was further introduced into the autoclave at room temperature and atmospheric pressure. The reaction mixture was polymerized for 3 hours while propylene replenished in a quantity such that the pressure of the propylene in the autoclave at a temperature of 75° C. was maintained at 25 kg/cm$^2$ G.

When the autoclave was opened after purging of the propylene gas, 284 g of a polymer was obtained. Deduction of 20 g of the initially added dispersing agent polymer from 284 g leaves 264 g as the quantity of the polymer produced by the polymerization.

Accordingly, the yield per unit titanium trichloride catalyst component [the yield per catalyst (gram of the polymer per gram of the titanium trichloride composition)]was 8,800. The stereospecificity (II) of the polymer was found to be 96.7% by a boiling heptane extraction method (correction was made to the dispersing agent).

Comparative Examples 1, 2 and 3

In order to indicate that the process of the present invention produces a solid catalyst component which is superior in performance than that obtained by known methods for preparing the solid catalyst including no heat and pulverization treatments, the following comparative experiment, were conducted.

(1) Preparation of titanium trichloride catalyst component (i) Reduction of titanium tetrachloride In each of the experiments, the entire procedure described in Example 1 was followed except as noted below.

(ii) Complexing treatment

In each of the experiment, complexing treatment was carried out according to the procedure described in Example 1 except that diisoamyl ether was used in a molar ratio of 0.7, 0.9 and 1.5, respectively, with respect to the titanium trichloride contained in the reduced solid.

(iii) Halogen compound treatment

In each of the experiment, treatment with titanium tetrachloride was carried out under the same conditions as described in Example 1.

(2) Polymerization of propylene

In each of the experiments following the procedure described in Example 1, gas-phase polymerization of propylene was carried out by using the titanium trichloride composition obtained by the above described manner.

The results obtained are set forth in Table 1.

Table 1

| Comp. Ex. | Complexing treatment | Result of polymerization of propylene | |
|---|---|---|---|
| | | Yield per cat. | Stereospecificity |
| 1 | 0.7 | 4,300 | 95.0 |
| 2 | 0.9 | 5,900 | 96.7 |
| 3 | 1.5 | 3,800 | 95.7 |

Example 2

This example is set forth to indicate that the titanium trichloride catalyst component obtained by the process of the present invention exhibits excellent performance in not only gas-phase polymerization but also liquid-phase polymerization. A titanium trichloride catalyst component was prepared and evaluated for liquid-phase polymerization of propylene in the following manner.

(1) Preparation of titanium trichloride catalyst component

A titanium trichloride catalyst component was prepared according to the procedure described in Example 1 except that: the heat treatment was carried out at a temperature of 160° C. for 8 hours; the complexing treatment was carried out in a molar ratio of isoamyl ether to TiCl$_3$ of 1.50; and the halogen compound treatment with titanium tetrachloride was carried out at a temperature of 70° C. for 2 hours by using a 30%, by volume, solution of TiCl$_4$ in hexane.

(2) Polymerization of propylene (liquid-phase polymerization)

300 mg of DEAC and 17mg of the titanium trichloride catalyst component prepared in the (1) above were introduced in the order named into an autoclave having a capacity of 1 liter and equipped with a stirrer under an atmosphere of propylene gas. Then, after 1 liter of hydrogen was further introduced into the autoclave at room temperature and atmospheric pressure, 800 ml of a liquefied propylene monomer was added thereto, and polymerization was started. The polymerization was continued at a temperature of 75° C. for 3 hours. After completion of the polymerization, the remaining monomers were purged, whereupon 213g of a polymer was obtained.

The yield per catalyst was 12,500 and the stereospecificity of the polymer was 94.9%.

Example 3

The preparation of a reduced solid and the heat treatment of the solid were conducted under the conditions and the procedure described in Example 1. The pulverization of the heat treated solid was carried out by a single pulverization process without the use of titanium tetrachloride. The pulverization conditions were similar to those described in Example 1 except that the pulverizing time was 24 hours (the crystal structure of the pulverized solid was of γ or δ-modification). The complexing agent and titanium tetrachloride treatments of the pulverized material were carried out according to the procedures described in Example 1 except that the molar ratio of diisoamyl ether to titanium trichloride was 1.3:1. Thus, a titanium trichloride catalyst component was prepared. Using this catalyst component, gas-phase polymerization of propylene was carried out under the same conditions as those described in Example 1.

When correction was made to the polymer used as a dispersing agent for the titanium trichloride catalyst, the yield per catalyst and the stereospecificity of the resulting polymer were 6,700 and 96.6%, respectively.

Comparative Examples 4 through 9

These comparative examples show that in accordance with the present invention, it is necessary and important to carry out the heat treatment and the pulverization treatment in a particular stage of the process for preparing a titanium trichloride catalyst component and in a continuous manner and that pulverization is highly effective, but a mere combination of known techniques cannot produce a solid catalyst component producing the excellent performance of the solid catalyst component obtained by the present invention.

The results obtained by these comparative examples are shown in Table 2.

Table 2

| Comp. Ex. | Process for preparing a titanium trichloride catalyst component[a] | Result of polymerization of propylene[b] | |
|---|---|---|---|
| | | Yield per catalyst | Stereospecificity |
| 4 | Reduction-heat treatment-complexing treatment-TiCl$_4$ treatment-pulverization | 1,500 | 95.7 |
| 5 | Reduction-heat treatment-complexing treatment-pulverization-TiCl$_4$ treatment | 2,400 | 95.6 |
| 6 | Reduction-complexing treatment-heat treatment-pulverization-TiCl$_4$ treatment | trace | — |
| 7 | Reduction-heat treatment-complexing treatment-pulverization-complexing treatment-TiCl$_4$ treatment | 2,700 | 90.4 |
| 8 | Reduction-heat treatment-complexing treatment-TiCl$_4$ treatment | 2,400 | 91.5 |
| 9 | Reduction-complexing treatment-TiCl$_4$ treatment-pulverization | 3,500 | 97.5 |

Note: [a]The respective treatment conditions of comparative Examples 4 through 8 are the same conditions as those described in Example 3. In Comparative Example 9, the titanium trichloride composition prepared by the known method described in Comparative Example 1 was pulverized under the same conditions as those described in Example 3.

[b]The polymerizations are all the same gas-phase polymerization of propylene as that described in Example 1. All numerical values are those obtained after correction was made for the dispersing agent polymer.

Comparative Examples 10 through 15

These comparative examples show that in accordance with the present invention, a titanium trichloride composition obtained by pulverizing a titanium trichloride composition having a β-crystal structure and a titanium trichloride composition containing a β-crystal structure after pulverization, even if it is of γ-type crystal structure prior to pulverization, cannot produce a titanium trichloride composition having excellent catalytic performance even if they are subjected to complexing agent and halogen compound (titanium tetrachloride) treatments.

The results are shown in Table 3.

Table 3

| | Process for preparing titanium trichloride catalyst component | | | | | | | | |
|---|---|---|---|---|---|---|---|---|---|
| | heat treatment | | Pulverization treatment | | | | Complexing treatment[*3] | Result of polymerization propylene[*5] | |
| Comp. Ex. | Reduction[*1] | Temperature (° C.) | Time (hour) | Pulverization style | Time (hour) | Crystal structure after pulverization | Mole ratio diisoamy ether to TiCl$_3$ | TiCl$_4$ treatment[*4] | Yield per catalyst | Stereospecific |
| 10 | " | none | | single pulverization | 48 | α | 1.4 | " | 170 | 67.2 |
| 11 | " | 155 – 160 | 2 | " | 32 | α | 1.35 | " | 3,800 | 97.1 |
| 12 | " | " | " | " | 72 | α | 1.4 | " | 1,500 | 94.7 |
| 13 | " | 165 – 170 | " | " | 96 | α | 1.3 | " | 1,100 | 94.1 |
| 14 | " | 170 | 4 | " | 43 | α + δ (mixed crystal) | 1.0 | " | 1,700 | — |
| 15 | " | 160 | | TiCl$_4$[*2] co-pulverization | 72 | α + δ (mixed crystal) | 1.3 | " | 2,900 | 96.7 |

Note: *1: A reduced solid was prepared according to the procedure described in Example 1.
*2: The quantity of the titanium tetrachloride used in the co-pulverization is represented as the molar ratio of TiCl$_4$ to TiCl$_3$ of 0.1.
*3: The other conditions for the complexing treatment are the same as those described in Example 1.
*4: The conditions as described in Example 1 were used.
*5: The polymerization conditions as described in Example 1 were used (correction was made for the dispersing agent).

Comparative Examples 16 through 18

These comparative examples show that a titanium trichloride catalyst component subjected to only a pulverization treatment and a titanium trichloride catalyst component subjected to only a complexing treatment can provide only a titanium trichloride catalyst component of a remarkably low catalytic performance.

The results are shown in Table 4.

Table 4

| Comp. Ex. | Process for preparing a titanium trichloride catalyst component*[1] | Crystal structure after pulverization | Result of polymerization of propylene | |
|---|---|---|---|---|
| | | | Yield per catalyst | Stereospecificity |
| 16 | Reduction-heat treatment-single pulverization (160° C., 8 hours) (48 hours) | δ | 700 | 86.6 |
| 17 | Reduction-heat treatment-TiCl₄ co-pulverization (160° C., 8 hours) (48 hours, TCl₄/TiCl₃ = 0.1) | δ | 1,000 | 84.8 |
| 18 | Reduction-heat treatment-TiCl₄ co-pulverization Complexing treatment (160° C., 8 hours) (48 hours, $\frac{TiCl_4}{TiCl_3} = 0.2$) ($\frac{Isoamyl\ ether}{TiCl_3} = 1.4$) | δ | 900 | 81.6 |

*)The treatment conditions other than those described in Table 4 are similar to those described in Examples 1 and 3.

Example 4

A reduction process was carried out under the conditions described in Example 1 except that EASC (ethylaluminum sesquichloride) was used as a reducing agent for titanium tetrachloride, and the molar ratio of EASC to TiCl₄ was 2. The resulting reduced solid was heat treated at a temperature of 155° to 160° C. for 2 hours. The heat treated solid was subjected to a single pulverization process for 24 hours. The pulverized solid had a δ-crystal structure and a molar ratio of EASC to TiCl₂ of 0.59. The complexing agent and halogen compound (titanium tetrachloride) treatments of the pulverized solid were carried out according to the procedures describwed in Example 1 except that the molar ratio of diisoamyl ether to titanium trichloride was 1.6:1.

By using the titanium trichloride catalyst component thus prepared, gas phase- polymerization of propylene was carried out in the same manner as described in Example 1.

The yield per catalyst was 5,000, and the sterospecificity of the resulting polymer was 97.6%.

EXAMPLE 5

The preparation of a titanium trichloride catalyst component and a polymerization were carried out according to the procedure desibed in Example 4 except that EADC (ethylaluminum dichloride) was used in a molar ratio of EADC to TiCl₄ of 1 as a reducing agent for titanium tetrachloride, and the molar ratio of isoamyl ether to TiCl₃ was 1.4 in the complexing treatment.

The yield per catlyst was 6,900, and the stereospecificity of the resulting polymer was 97.9%.

Examples 6 through 10

A reduced solid was prepared in the same manner as described in Example 1. The reduced solid was heat treated at a temperature of 160° C. for 8 hours, and the titanium tetrachloride co-pulverization treatment of the heat treated solid was carried out with various molar ratios of TiCl₄ to TiCl₃ for 48 hours. The complexing agent and halogen compound (titanium tetrachloride) treatments of the pulverized solid were carried out according to the procedures described in Example 1 except that the amount of the complexing agent was varied. Thus, a titanium trichloride catalyst component was obtained. The polymerization evaluation for the catalyst component was carried out according to the same liquid phase polymerization of propylene as described in Example 2.

the results are shown in Table 4.

Table 4

| | TiCl₄ co-pulverization treatment | | Complexing treatment | Result of polymerization | |
|---|---|---|---|---|---|
| | Molar ratio of TiCl₄ to TiCl₃ | Crystal structure after pulverization | Molar ratio of isoamyl ether to TiCl₃ | Yield per catalyst | Stereospecificity |
| Example 7 | 0.05 | δ | 1.3 | 9,400 | 96.6 |
| Example 8 | 0.10 | " | 1.4 | 10,800 | 96.6 |
| Example 9 | " | " | 1.5 | 12,100 | 95.9 |
| Example 10 | 0.15 | " | 1.5 | 10,300 | 96.3 |
| Example 11 | " | " | 1.7 | 10,100 | 96.2 |

Examples 11 through 14

A reduced solid was prepared in the same manner as described in Example 1. The reduced solid was heat treated at a temperature of 160° C. for 8 hours. The titanium tetrachloride co-pulverization treatment of the heat treated solid was carried out with a molar ratio of TiCl₄ to TiCl₃ of 0.1. The resulting titanium trichloride composition having a — crystal structure was subjected to complexing treatment with a mole ratio of diisoamyl ether to TiCl₃ of 1.5. Then the halogen compound (titanium tetrachloride) treatment of the resulting composition was carriedout under various conditions to produce titanium trichloride catalyst components. the respective titanium trichloride catalyst components were evaluated for performance according to the propylene liquid-phase polymerization process as described in Example 2.

The results are shown in Table 6.

Table 6

| | Lewis acid (TiCl₄) treatment | | | Result of polymerization of propylene | |
|---|---|---|---|---|---|
| | Concentration (% by volume) | Temperature (° C.) | Time (hour) | Yield per catalyst | Stereo-specificity |
| Ex. 11 | 20 | 70 | 4 | 8,400 | 97.9 |
| Ex. 12 | 30 | 65 | 4 | 11,000 | 97.7 |
| Ex. 13 | 40 | 40 | 2 | 7,500 | 94.3 |
| Ex. 14 | 100 | room temperature | 4 | 6,800 | 95.6 |

Example 15

A reduced solid was prepared in the same manner as described in Example 1. The reduced solid was heat treated at a temperature of 160° C. for 8 hours and then subjected to a single pulverization treatment for 24 hours. the pulverized solid (δ - TiCl₃) ws subjected to complexing treatment by using dipheneyl ether (the molar ratio of diphenyl ether to TiCl₃ being (1.2). The halogen compound (titanium tetrachloride) treatment of the resulting solid was carried out according to the same conditions as those described in Example 1. Thus, a titanium trichloride catalyst component was obtained. Using this catalyst component gas-phase polymerization of propylene was carried out according to the procedure described in Example 1. The yield per catalyst was 2,500, and the stereospecificity of the resulting polymer was 95.2%.

Example 16 the complexing agent-treated solid obtained by effecting the entire precedure described in Example 2 up to the point of the complexing treatment was subjected to halogen compound treatment by using tellurium tetrachloride (TeCl₄).

The treatment with TeCl₄ was carried out by adding 0.4 g of TeCl₄ purified by a recrystallization method to the complexing agent-treated solid suspended in 100 ml of a dried and degassed chlorobenzene solvent (with a weight ratio of TeCl₄ to treated solid of 0.04) and heating the resulting mixture at a temperature of 85° C. for 2 hours.

After the treatment, the solid component was washed with 100 ml portions of chlorobenzene for the first two times and then washed theree times with 100-ml portions of hexane by means of decantation.

Polymerization of propylene was carried out by using 300 mg of DEAC and 10 mg of the titanium trichloride catalyst component according to the liquid phase polymerization method described in Example 2.

The yield per catalyst was 15,500 and the sterospecificity of the resulting polymer ws 97.2%.

Example 17

Halogen compound treatment was carried out according to the procedure descibed in Example 16 except that 1.2g of selenium tetrachloride (SeCl₄) was used as a halogen compound and toluene was used as a treating solvent. After the treatment, the solid component was first washed with 100 ml of toluene and then washed five times each time with 100-ml portion of hexame by decantation.

Polymerization of propylene was carried out by using 300 mg of DEAC and 15 mg of the titanium trichloride catalyst component according to the liquid phase polymerization method described in Example 2.

The yield per catalyst was 10,700, and the sterospecificity of the resulting polymer was 97.7%.

Example 18

The procedure described in Example 2 were repeated up to the point where the complexing treatment was completed except that the molar ratio of diisomyl ether to titanium trichloride was 1.4.

The resulting complexing agent-treated solid was suspended in 100 ml of dried and degassed toluene, and 3.0g of antimony trichloride purified by reduced pressure distillation was added to the suspension, the weight ratio of antimony trichloride to treated solid being 0.3. The resulting suspension was heated to a temperature of 80° C. for 2 hours. After the treatment, the treated solid was first washed with 50 ml of toluene and then washed five times, each time with a 500-ml portion of hexane.

The polymerization evaluation for the resulting solid was carried out according to the propylene liquid phase polymerization method as described in Example 2 except that 200 mg of the titanium trichloride catalyst component was used. The yield per catlyst was 3,500 and sterospecificity of the resultant polymer was 96.7%.

Example 19

The complexing agent treated solid obtained as in Example 2 up to the point of the complexing treatment was subjected to the halogen compound treatment by using titanium trichloride. The above tianium trichloride was prepared by reducing titanium tetrachoride with DEAC, heating the resulting titanium trichloride to effect the transition of its crystal construction, and pulverizing the heat treated solid for 48 hours.

The treatment with the titanium trichloride was conducted by adding 2.0g of the titanium trichloride to a suspension of the complexing agent-treated solid in 100 ml of toluene, the weight ratio of TiCl₃ to treated solid being 0.2, and heating the suspension at a temperature of 100° C. for 2 hours. After the treatment, the resulting suspension was first washed with 100 ml of toluene and then washed four times in toal each time with a 100-ml of portion of hexane. The washing was carried out by a decantation method. Liquid phase polymerization of propylene was conducted according to the procedure described in Example 2.

The yield per catalyst was 4,800, and the sterospecificity of the resulting polymer was 93.5%.

Example 20

A complexing agent treated solid obtained as in Example 2 up to the point of the complexing treatment was subjected to halogen compound treatment with the use of aluminum chloride.

the halogen compound treatment was conducted by suspending the complexing agent treated solid in 100 ml of dried and degassed mesitylene, adding 2,5% of aluminum chloride purified by a sublimation method to the suspension, the weight ratio of AlCl₃ to treated solid being 0.25, and heating the resulting suspension at a temperature of 100° C. for 2 hour. After the treatment, the resultant suspension ws washed 5 times each time with a 100-ml portion of a solvent (according to decantation). the first washing was carried out with mesitylene, and the other four washings were all carried out with hexane.

The polymerization evaluation for the resulting catalyst component was carried out according to the propylene liquid phase polymerization process described in Example 2.

The yield per catalyst was 4,000 and the sterospecificity of the resultant polymer was 93.4%.

Example 21 (Slurry polymerization)

500 ml of dried and degassed heptane, 260 mg of DEAC, and 10 mg of the titanium trichloride catalyst component prepared in Example 1 were added in the order to a Widmer for preparing a catalyst to prepare a polymerization catalyst slurry.

After an autoclave having a capacity of 1 liter and equipped with a stirrer was repeatedly subjected to several operations of vacuum exhaustion — introduction of gaseous propylene, the polymerization catalyst slurry was introduced into the autoclave under an atmosphere of gaseous propylene. Then, 30 ml of hydrogen was added to the autoclave at room temperature and atmosphereic presure. Polymerization was thereafter continued at a temperature of 70° C. for 6 hours while propylene was supplied thereby to maintain a propylene pressure of 9 kg/cm$^2$G.

After the proplylene gas had been purged, the resulting polymer slurry was withdrawn and filtered off. 115.5g of a solid polymer was obtained. When the solvent of the filtrate was evaporated to dryness, 1.5g of a viscous polymer was obtained.

The yield per catalyst was 11,700.

The sterospecificity (hereinafter referred to as product II) of the solid polymer was found to be 97.8% according to a boiling heptane extraction method.

Accordingly, the total II was 96.6%.

total II =
$$\frac{\text{polymer which is not dissolved by the heptane extraction}}{\text{solid polymer + dissolved polymer in polymerization solvent}}$$

EXAMPLE 22

The preparation of a catalyst and polymerization of propylene were carried out according to the procedure described in Example 3 except that 30 mg of DEAC was used, the weight ratio of DEAC to titanium trichloride composition being 3.

108.3 g of a solid polymer was obtained. 1.7g of a polymer was obtained from the polymerization solvent. The product II of the solid polymer was 98.9%.

Accordingly, the yield per catalyst was 11,000, and the total II was 97.4%.

EXAMPLE 23

(1) Preparation of titanium trichloride catalyst component (i) Reduction of TiCl$_4$ and heat treatment 90 ml of hexane and 45.0 ml of TiCl$_4$ were placed in a 500-ml four necked flask equipped with a stirrer. Then, a solution consisting of 150 ml of hexane and 50.6 ml of DEAC was continuously dropped into the flask under an atmosphere of argon over 4 hours through a Widmer apparatus. The reaction solution was kept at a temperature of 0° C. After the completion of the dropping, the stirring was continued at that temperature for 15 minutes. The temperature was then raised to 65° C., and the solution was stirred at that temperature for an additional 1 hour to complete the reaction.

After the reaction mixture was left standing, a black brown solid was obtained. This solid was washed five times each time with a 110-ml portion of hexane (according to decantation). The resultant titanium trichloride had a β-crystal structure.

A flask containing a slurry of the black brown solid was immersed in an oil bath at a temperature of 150° C. and heat treated in an atmosphere of argon for 6 hours. The crystal structure of the solid was converted to the γ-modification.

(ii) Titanium tetrachloride co-pulverization treatment 60 g of the heat treated solid obtained in (i) and 3.3 ml of TiCl$_4$ were charged into a pot of a vibration mill in a dry box in an atmosphere of an argon gas. These materials were co-pulverized for 48 hours. The other pulverization conditions were similar to those described in Example 1.

(iii) Complexing treatment 10 g of the co-pulverized solid sample obtained in (ii) was subjected to complexing treatment. The complexing treatment was carried out by suspending 10g of the sample in 50 ml of hexane and adding 14.4 ml of diisoamyl ether to the resulting suspension, the molar ratio of dissoamyl ether to TiCl$_3$ being 1.4, to subject the resulting mixture to a temperature of 35° C. for 2 hours. After the completion of the reaction, the reaction mixture was left standing and then washed five times each time with a 50-ml portion of hexane by decantation.

(iv) ICl$_3$ treatment

After almost all of the supernatant liquid of the solid slurry obtained in (iii) had been removed, 100 ml of 1,2-dichloroethane and 0.605 g of iodine trichloride ICl$_3$, the molar ratio of ICl$_3$ to TiCl$_3$ being 0.051, were added to the remaining solid slurry and the resulting mixture was subjected to the reflux temperature (about 75° C.) of the solvent for 3.5 hours.

Upon completion of the treatment, the resulting solid component was washed with 100-ml portions of 1,2-dichloroethane for the first two times and thereafter washed with 100 -mil portions of hexane three times by decantation. Thus, the final titanium trichloride as a catalyst component was obtained.

(2) Polymerization of propylene (liquid phase polymerzation)

300 mg of DEAC and 15 mg of the titanium trichloride catalyst component obtained in (iv) were introduced in this order into an autoclave having a capacity of 1 liter and equipped with a stirrer in an atmosphere of a propylene gas. After 1.2 liter of hydrogen was further introduced into the autoclave at room temperature and atmospheric pressure, 700-ml of a liquefied propylene monomer was added thereto and polymerization was started. The polymerization was continued at a temperature of 75° C. for 3 hours.

A gradual reduction in pressure was observed for the last thirty minutes of the polymerization operation, which indicated that that polymerization reaction was being carried out in a gas-phase state. However, the polymerization reaction was continued as it was, the final pressure being reduced to 28kg/cm$^2$ G. When the polymerization was complete, the remaining monomers were perged. 260g of a polymer was obtained. The yield per catalyst was 17,300 and the stereospecificity of the polymer was 97.6%.

EXAMPLE 24 through 26

A slurry of the complexing agent treated titanium trichloride obtained by effecting the treatments described in Example 23 up to the point of the complexing treatment was subjected to ICl$_3$ treatment by using different amounts of ICl$_3$. The treatment conditions were similar to those described in (iii) of Example 23 except that the treatment time was 2 hours.

Polymerization of propylene was also carried out according to the procedure and conditions described in (2) of Example 23.

The results are shown in the following table.

Table 1

|  | ICl$_3$ treatment | | Result of polymerization of propylene | |
| --- | --- | --- | --- | --- |
|  | ICl$_3$ (g) | Molar ratio of ICl$_3$ to TiCl$_3$ | Yield per catalyst | Stereospecificity |
| Ex. 24 | 0.271 | 0.0230 | 13,900 | 95.0 |
| Ex. 25 | 0.405 | 0.0344 | 15,200 | 96.0 |
| Ex. 26 | 0.945 | 0.803 | 17,100 | 96.8 |

EXAMPLE 27

A titanium trichloride catalyst component was prepared according to the procedure and conditions described in Example 23 except that 0.3 g of ICl, the molar ratio of ICl to TiCl$_3$ being 0.0366, was used instead of ICl$_3$.

Polymerization of propylene was carried out according to the procedure described in Example 23.

The yield per catalyst was 13,900 and the stereospecific property of the resultant polymer was 93.6%.

We claim:

1. A process for preparing a titanium trichloride composition comprising steps of:
   reducing titanium tetrachloride with an organoaluminum compound to produce a titanium trichloride composition having a $\beta$-crystal structure; then
   heat treating the resulting titanium trichloride composition having a $\beta$-crystal structure, and subsequently
   pulverizing the heat-treated titanium trichloride to produce a titanium trichloride composition in the $\delta$ form containing substantially no titanium trichloride having a $\beta$-crystal structure; then
   treating the pulverized titanium trichloride composition with an ether complexing agent for said titanium trichloride selected from the group consisting of diethyl ether, di-n-butyl ether, di-n-amyl ether, diisoamyl ether, di-n-hexyl ether, anisole, diphenyl ether, diethylene glycol dimethyl ether, and diethylene glycol mono-n-butyl ether; and
   treating said titanium trichloride composition which has been treated with said complexing agent with an interhalogen compound.

2. The process as claimed in claim 1 in which the organoaluminum compound has the formula:

$$Al\ R_n\ Cl_{3-n}$$

wherein n is a number satisfying an equation:

$$0 < n \leqq 3$$

and R is a hydrocarbon residue having 1 to 10 carbon atoms.

3. The process as claimed in claim 2 in which the organoaluminum compound is a member selected from the group consisting of diethylaluminum chloride, ethylaluminum sesquichloride and ethylaluminum dichloride.

4. The process as claimed in claim 1 in which the reduction temperature is in the range of $-30°$ C. to $+30°$ C.

5. The process as claimed in claim 1 in which the titanium trichloride composition having a $\beta$- crystal structure is heat treated at a temperature of 100° to 200° C., under an atmosphere of an inert gas for 1 to 10 hours.

6. The process as claimed in claim 1 in which the heat treated titanium trichloride is pulverized for 10 to 72 hours.

7. The process as claimed in claim 1 in which the heat treated titanium trichloride is pulverized in the presence of titanium tetrachloride to produce titanium trichloride having substantially no titanium trichloride having a $\beta$-crystal structure.

8. The process as claimed in claim 7 in which the titanium tetrachloride is in a quantity of from 0.03 to 0.3 mole per mole of the titanium trichloride.

9. The process as claimed in claim 1 in which the complexing agent is in a quantity of from 0.3 to 3.0 moles per mole of the titanium trichloride.

10. The process as claimed in claim 1 in which the complexing is carried out at a temperature of from room temperature to 100° C. for from 30 minutes to 4 hours.

11. The process as claimed to claim 1 in which the interhalogen compound has the formula $$XY_n$$

wherein X and Y are different halogen atoms, and n is 1, 3, 5 or 7.

12. The process as claimed in claim 11 in which the interhalogen compound is a member selected from the group consisting of ClF, BrF, IF, BrCl, ICl, IBr, ClF$_3$, BrF$_3$, IF$_3$, ICl$_3$ or I$_2$Cl$_6$, ClF$_5$, BrF$_5$, IF$_5$ and IF$_7$.

13. The process as claimed in claim 12 in which the interhalogen compound is a member selected from the group consisting of ICl$_3$ and ICl.

14. The process as claimed in claim 1 in which the treatment with the interhalogen compound is carried out in the presence of a diluent at a temperature of from room temperature to 150° C. for from 30 minutes to 10 hours.

15. The process as claimed in claim 14 in which the diluent is a halogenated hydrocarbon.

16. The process as claimed in claim 1 in which the interhalogen is in a quantity of 0.005 to 0.1 mole per mole of the titanium trichloride.

17. The process as claimed in claim 1 in which the titanium tetrachloride composition having a $\beta$-crystal structure is heat treated at a temperature of about 150° to 180° C. under an atmosphere of an inert gas for 1 to 10 hours.

18. A process as claimed in claim 1 in which said titanium trichloride is heat treated to transform said titanium trichloride having a $\beta$-crystal structure into titanium trichloride having a $\gamma$-crystal structure.

19. A process as claimed in claim 1 in which said titanium trichloride is heat treated so as to transform said titanium trichloride having a $\beta$-crystal structure into titanium trichloride having a $\gamma$-crystal structure containing substantially no $\beta$-crystal structure.